(12) United States Patent
Lai

(10) Patent No.: US 6,446,087 B1
(45) Date of Patent: Sep. 3, 2002

(54) SYSTEM FOR MAINTAINING THE INTEGRITY OF APPLICATION DATA

(75) Inventor: Michael C. Lai, Lisle, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/186,005

(22) Filed: Nov. 4, 1998

(51) Int. Cl.[7] .............................................. G06F 12/00
(52) U.S. Cl. ...................................................... 707/201
(58) Field of Search ................................. 707/200, 201; 709/1, 100, 101, 102, 106

(56) References Cited

U.S. PATENT DOCUMENTS

| | | | | |
|---|---|---|---|---|
| 5,459,862 A | * | 10/1995 | Garliepp et al. | 395/600 |
| 5,924,103 A | * | 7/1999 | Ahmed | 707/201 |
| 5,964,828 A | * | 10/1999 | Cummins | 709/101 |
| 6,012,094 A | * | 1/2000 | Leymann et al. | 709/230 |
| 6,029,177 A | * | 2/2000 | Sadiq et al. | 707/201 |
| 6,049,807 A | * | 4/2000 | Carroll et al. | 707/201 |

* cited by examiner

Primary Examiner—James P. Trammell
Assistant Examiner—Mary Wang
(74) Attorney, Agent, or Firm—Patton Boggs, LLP

(57) ABSTRACT

The system for maintaining the integrity of application data functions to provide a mechanism to generate safe and efficient database transactions. This is accomplished by minimizing the number of constraints applied to the data stored in the database by segmenting the database into two portions: a set of base data objects and a set of view data objects. The base data objects comprise a set of data that is normalized to reduce the need for complex integrity checks. The set of view data objects represents views of the base data objects as presented in a form needed by the various applications extant in the processor. The system for maintaining the integrity of application data enables the applications to access both the view data objects the base data objects, but to effect a change in the data contained therein, access via an integrity checking process is only provided to the base data objects. The system for maintaining the integrity of application data updates the base data objects using integrity checks, which updates are then propagated to the view data objects to maintain the currency and consistency of these view data objects. The definitions of the various views are architected to capture the semantics of the derived data so there is no need for integrity constraints in the view data objects. Therefore, whatever integrity constraints are necessary are imposed only on the normalized base data objects when modifications to the data stored therein are requested, thereby minimizing the complexity of updates.

10 Claims, 2 Drawing Sheets

SYSTEM FOR MAINTAINING THE INTEGRITY OF APPLICATION DATA

FIELD OF THE INVENTION

This invention relates to processor systems that support multiple concurrently operational applications and, in particular, to a system for simplifying the procedures used to maintain the integrity of data that is stored in a database without adversely effecting data access speed.

Problem

It is a problem in database systems to maintain the integrity of data that is stored in the database system and accessible by a plurality of concurrently operational processes. The speed of access to data that is stored in a database is critical for the efficient operation of a processor. The data must be retrieved and updated as quickly as possible while also maintaining the integrity of the data that is stored in the database for use by a number of concurrently operational applications. The database system therefore typically includes control software that manages a set of data integrity constraints defined by the data population rules. The database system must ensure that the transactions that populate and/or modify the data that is stored in the database system do not violate these data population rules and negatively impact the integrity of the data that is stored in the database system.

The classic way of handling data integrity uses triggers in the database system. Every time the database system recognizes that a received request results in a change in a selected database object, the database system triggers a routine which implements constraint checking for the selected database object. If the constraints defined for the selected database object are not violated, then the database system updates the selected database object. This process is simple but cannot easily handle complex constraint rules. The database also must implement the triggers, as defined by the database programmers, for every database object that is stored in the database for every data access, which slows the speed of operation of the database. Alternatively, the database system integrity maintenance logic can be programmed into the data constructor member function and the data destructor member function that operate to implement the data changes. This eliminates the need for database implemented triggers but it is difficult to handle complex inter-object rules, such as relationship constraints, using this architecture. In addition, changes to data members of classes must be made only via the specifically named data access function.

A further problem is that it is desirable to use an object oriented database system programming language, which enables program updates in an efficient manner. However, there is a mismatch between object oriented programming languages and the traditional methodologies used in relational database technology to ensure data integrity. The object oriented database technology does not adequately support data integrity processes that can address the complex data interactions and constraints. Existing object oriented database systems do not provide any tools that directly address integrity enforcement for complex constraints. The available tools are directed to only simple database relationships. Custom software can be developed to overcome this problem, using object oriented query languages or database programming languages, but such a solution is vendor specific, not widely supported and, since it is custom software, would be expensive to develop and maintain as changes occur in the underlying database programming language.

Solution

The above described problems are solved and a technical advance achieved by the present system for maintaining the integrity of application data, which functions to provide a mechanism to generate safe and efficient database transactions. This is accomplished by minimizing the number of constraints applied to the data stored in the database by segmenting the database into two portions: a set of base data objects and a set of view data objects. The base data objects comprise a set of data that is normalized to reduce the need for complex integrity checks. The set of view data objects represents views of the base data objects as presented in a form needed by the various applications extant in the processor. The system for maintaining the integrity of application data enables the applications to access both the view data objects the base data objects, but to effect a change in the data contained therein, access via an integrity checking process is only provided to the base data objects. The system for maintaining the integrity of application data updates the base data objects using integrity checks, which updates are then propagated to the view data objects to maintain the currency and consistency of these view data objects. The definitions of the various views are architected to capture the semantics of the derived data so there is no need for integrity constraints in the view data objects. Therefore, whatever integrity constraints are necessary are imposed only on the normalized base data objects when modifications to the data stored therein are requested, thereby minimizing the complexity of updates.

DETAILED DESCRIPTION

Figure 1:
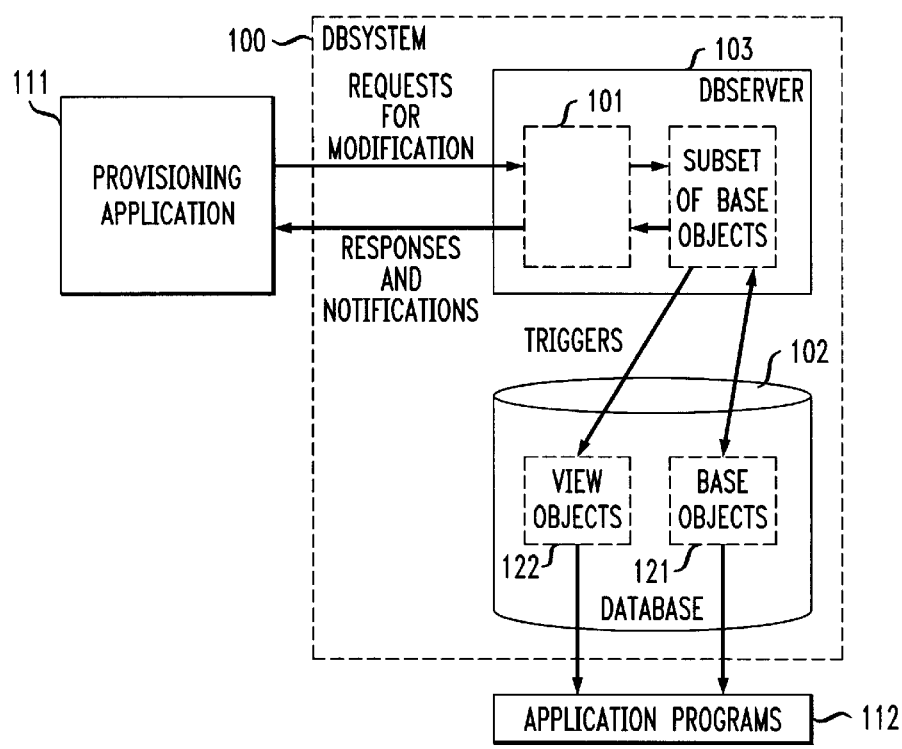
FIG. 1 illustrates in block diagram form the overall architecture of the present system for maintaining the integrity of application data and an environment in which it operates.
Figure 2:
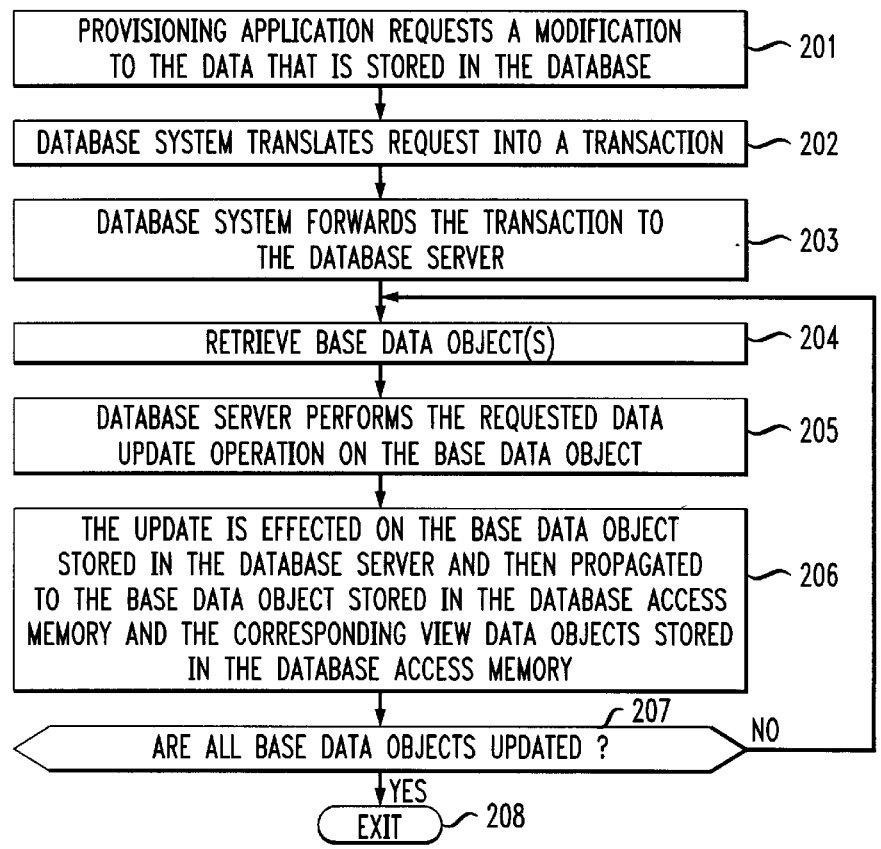
FIG. 2 illustrates in flow diagram form the typical operation of the present system for maintaining the integrity of application data.

FIG. 1 illustrates in block diagram form the overall architecture of the present system 101 for maintaining the integrity of application data and a database 100 environment in which it operates, while FIG. 2 illustrates in flow diagram form the typical operation of the present system for maintaining the integrity of application data 101. The system of FIG. 1 illustrates a typical environment of the type found in communications systems wherein a plurality of applications 111, 112 are concurrently active and require coordinated access to data that is stored in a common database memory 102. For the purposes of this description, a telecommunication environment is selected and the application of interest is call processing 112. The data that is stored in the database memory 102 can comprise, for example: subscriber information, call connection data, call processing data, equipment identification and control data, call billing data, and the like. The modification of this data must be effected efficiently by the database 100 to enable the various applications 112 to execute in a timewise efficient manner. The data management efficiency of the database 100 directly impacts the processing capability of the various applications 112.

The architecture disclosed in FIG. 1 includes two applications: call processing 112 and provisioning agent 111. The call processing application 112 comprises the well known communication connection processing and feature software that is found in communication systems. The provisioning agent 111 comprises an application that manages the definition of the underlying communication system environment. For example, the provisioning agent 111 adds, changes, deletes subscriber information as well as equipment information. Thus, the primary focus of the call processing application 112 is the use of the data defined by the provisioning agent 111, while the provisioning agent 111 is primarily focused on modifications of the base data objects that define the underlying communication system.

In order to render the operation of the database 100 more efficient, the data stored therein is divided into two components: a set of base data objects 121 and a set of view data objects 122. The base data objects comprise a set of data 121 that is normalized to reduce the need for complex integrity checks. The set of view data objects 122 represents various views of the base data objects 121 as presented in a form needed by the various applications 112 executing in the system. The system 101 for maintaining the integrity of application data enables the applications to read-only access the view data objects 122 and the base data objects 121 but cannot effect a change in the data contained therein. The system for maintaining the integrity of application data 101 updates the base data objects 121 using the integrity checks, which updates are then propagated to the view data objects 122 to maintain the currency and consistency of these view data objects 122. The definitions of the various views are architected to capture the semantics of the derived data so there is no need for integrity constraints in the view data objects 122. Therefore, whatever integrity constraints are necessary are imposed only on the normalized base data objects 121 when modifications to the data stored therein are requested, thereby minimizing the complexity of updates.

The base data objects 121 and their associated integrity constraints are generated as the result of analysis and modeling of the application data requirements. The view data objects 122 and their associated attributes are derived from the base data objects 121, either logically or physically. The integrity constraint checking is done for base data objects 121 only and the integrity checking code is integrated into or invoked by the database base class constructors (for inserting data into the database), member functions that perform updates (for the modification of existing data in the database), and destructors (for deleting data from the database). Inter-object constraints are difficult to maintain and can be replaced by an equivalent set of intra-object constraints. When a base data object 121 changes state, the system automatically updates all of the associated view data objects 122 via a notification mechanism that is implemented by member functions.

Creation of the Database Elements in the Development Environment

Figure 3:
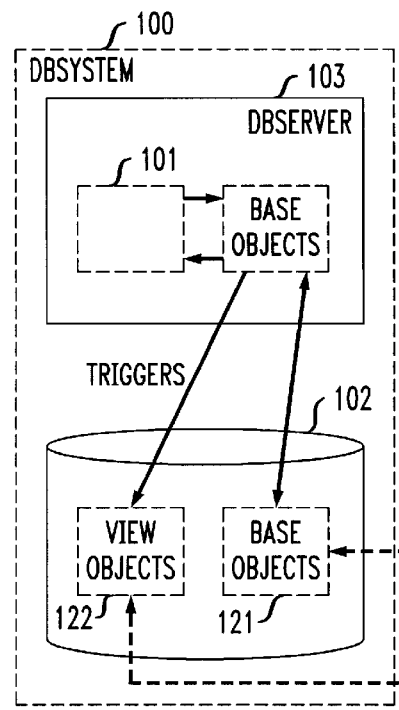
FIG. 3 illustrates in block diagram form the operation of the present system for maintaining the integrity of application data in the creation of the segmented database comprising base data objects and view data objects.
Figure 3:
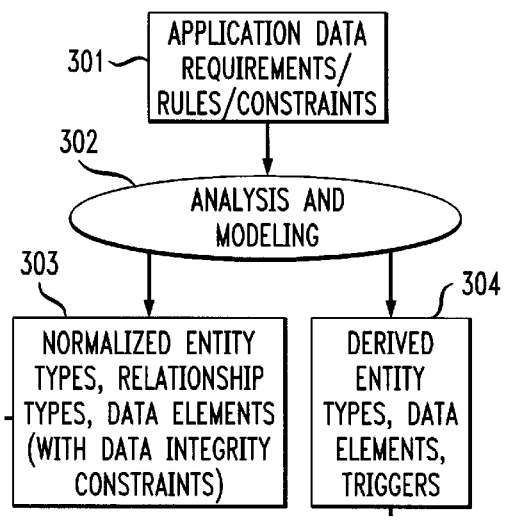

FIG. 3 illustrates in block diagram form the steps taken to operate the present system for maintaining the integrity of application data, in the creation of the segmented database comprising base data objects and view data objects. At the time when the application is being developed, the programmer reviews the application (such as call processing) data requirements, rules and constraints 301. This data is analyzed and modeled 302 to create 303 a set of base data objects 121 and associated constraints and rules that are formatted in terms of normalized entity types, relationship types, base data elements. The modeling process 302 also results in the generation 304 of derived entity types, view data elements, and associated transactions. The base data object 121 portion of the database memory 102 is populated with the base data objects 121 and associated data management data (integrity constraints), while the view data object 122 portion of the database memory 102 is populated with view data objects 122.

Data Access Processes

Figure 4:
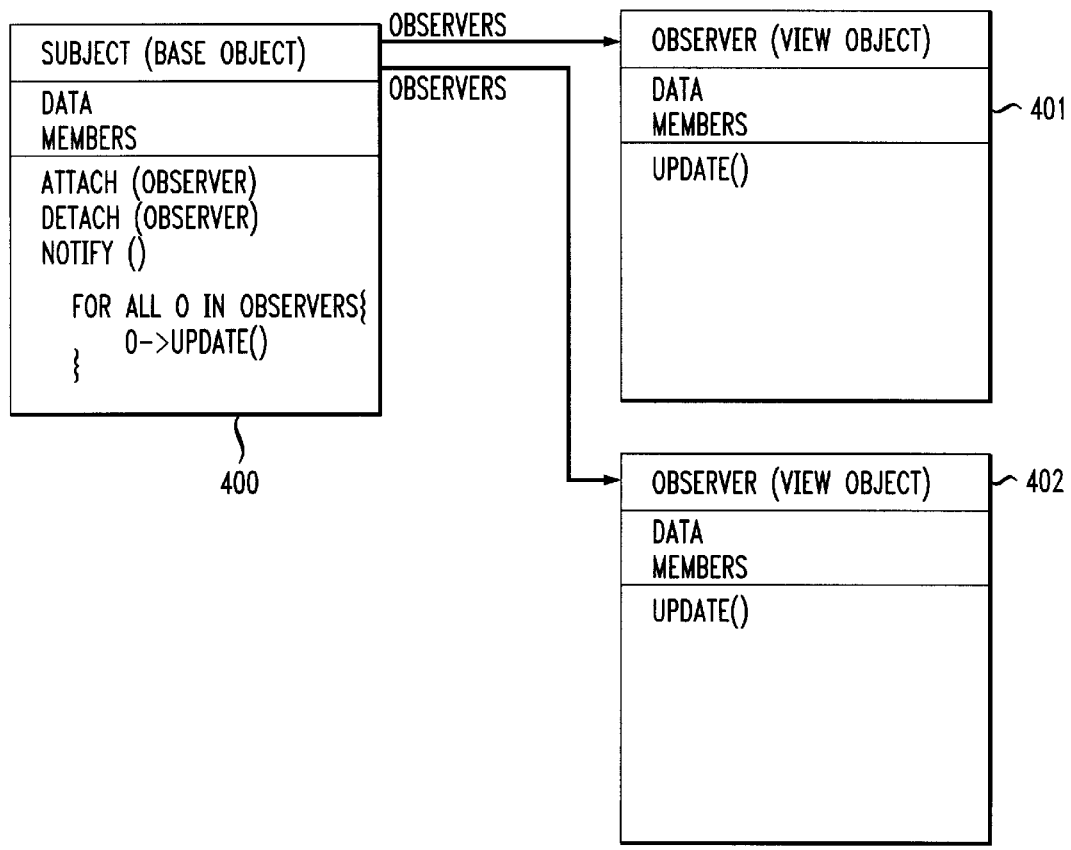
FIG. 4 illustrates in block diagram form the interaction between a base data object and its associated view data object(s).

The call processing application 112 accesses the view data objects 122 and the base data objects 121 that are stored in the database memory 102 on a read-only basis to perform the required application operations. Whenever the provisioning application 111 requests, at step 201, a modification to the data that is stored in the database memory 102, receipt of the request by the database server 103 occasions the translation of the received request at step 202 into a transaction which comprises one or more base data object changes. The transaction is an atomic event and it is forwarded at step 203 to the database server 103 for processing of the request. The database server 103 at step 204 retrieves the base data object identified in this request from the base data objects 122 stored in database memory 102. The database server 103 performs the requested data update operation at step 205 on the base object 121 identified in the request. The update is effected on the base data object 121 stored in the database server 103 and then propagated at step 206 to the base data object 121 stored in the database memory 102 and the corresponding view data objects 122 stored in the database memory 102. This operation is shown in block diagram form in FIG. 4 where a base data object 400 is programmed with the necessary code to effect the integrity check of its data and it is associated in this case with two view data objects 401, 402, although a base data object may not have an associated view data object. When a modification is effected to the base data object 400 by the database server, the Notify function propagates the modification to the associated view data objects 401, 402.

At step 207 a check is made to determine whether additional base data objects in this transaction need to be modified. If so, processing returns to step 204 where the next base data object in the transaction is modified pursuant to the received request. Once all of the base data objects associated with this transaction have been processed, then processing exits at step 208.

In this manner, the base data objects 121 are maintained isolated from the accessing application (call processing) and no integrity check need be performed on the view data objects 122 or base data objects 121 stored in database memory 102, since the integrity of this data is ensured by the present system 101 for maintaining the integrity of application data managing the integrity of the base data objects. All data changes are processed through the database server 103 and made to the base data objects that have been read into the database server 103, then propagated to the base data objects 121 and their associated view data objects 122 that are stored in database memory 102.

Processing of Database Data Access Transactions

In the present system for maintaining the integrity of application data, a single data processing request translates into a single database read/insert/modify/delete transaction that is typically executed on the fly. However, a single database transaction can involve multiple base data objects, each of which can result in multiple view data object changes, although a base data object may not be linked to any view data object.

Read—the provisioning application 111 only reads base data objects 121 from database memory 102 into the database server 103 to effect modifications to this data, while the call processing application 112 reads both base data objects 121 and view data objects 122 in a read only mode to utilize this data. Since the read operation does not impact the integrity of the data that is stored in the database memory 102, no data integrity checking is required for this operation.

Insert—A database insert operation calls the database server 103 which, for each selected base data object 121 involved, initializes all base data object attributes to their default values and then overwrites these with the attributes passed by the request. Once this is done, the database server 103 invokes both intra-object checking and inter-object checking member functions to perform integrity constraint validation for the selected base data object. If both processes return a successful result, then the selected base data object is inserted and all associated view data objects 122 are populated.

Modify—For each base data object involved, the database server 103 calls the modify member function which reads the selected base data object 121 from the database memory 102 then overwrites this data with the data changes received in the request. Once this is done, the database server 103 invokes both intra-object checking and inter-object checking member functions to perform integrity constraint validation. If both processes return a successful result, then the base data object is modified and all associated view data objects are populated.

Delete—For each base data object involved, the database server 103 calls the destructor member function and checks for the existence of the identified base data object. Once this is done, the database server 103 invokes both intra-object checking and the inter-object checking member functions for referential integrity. If both processes return a successful result, then the base data object is deleted and all associated view data objects are deleted.

Summary

The execution of safe and efficient database transactions is accomplished by minimizing the number of constraints applied to the data stored in the database by segmenting the database into two portions: a set of base data objects and a set of view data objects. The base data objects comprise a set of data that is normalized to reduce the need for complex integrity checks. The set of view data objects represents views of the base data objects as presented in a form needed by the various applications extant in the processor. The system for maintaining the integrity of application data enables the applications to access the view data objects and the base data objects on a read only basis and to effect a change in the data contained therein, the provisioning application must initiate a change process, with the necessary data integrity checks. The system for maintaining the integrity of application data updates the base data objects using the integrity checks, which updates are then propagated to the view data objects to maintain the currency and consistency of these view data objects.

What is claimed:

1. A database system for maintaining integrity of data that is stored in said database system, comprising:

means for storing base data objects and associated integrity constraints in a memory;

means for storing, in a read only form and absent integrity constraints, a set of view data objects that comprise said base data objects only reformatted into a view corresponding to a need of an application;

means, responsive to a request to modify data that is stored in said database, for identifying a base data object that is the target of said request to modify data; and means for performing a data integrity check on said identified base data object using said associated integrity constraints.

2. The system for maintaining integrity of data of claim 1 further comprising:

means, responsive to said data integrity check, for modifying said identified base data object.

3. The system for maintaining integrity of data of claim 2 further comprising:

means for identifying all view data objects related to said identified base data object; and means for modifying said identified view data objects absent performing a data integrity check on said identified view data objects.

4. The system for maintaining integrity of data of claim 1 further comprising:

means for normalizing said base data objects.

5. A method for operating a database system to maintain integrity of data that is stored in said database system, comprising the step of:

storing in a memory base data objects and associated integrity constraints;

storing in a memory, in a read only form and absent integrity constraints, a set of view data objects that comprise said base data objects only reformatted into a view corresponding to a need of an application;

identifying, in response to a request to modify data that is stored in said database, a base data object that is the target of said request to modify data; and performing a data integrity check on said identified base data object using said associated integrity constraints.

6. The method for maintaining integrity of data of claim 5 further comprising the step of:

modifying, in response to said data integrity check, said identified base data object.

7. The method for maintaining integrity of data of claim 6 further comprising the steps of:

identifying all view data objects related to said identified base data object; and modifying said identified view data objects absent performing a data integrity check on said identified view data objects.

8. The method for maintaining integrity of data of claim 5 further comprising the step of:

normalizing said base data objects.

9. A database system for maintaining integrity of data that is stored in said database system, comprising:

base data object memory means for storing base data objects and associated integrity constraints;

view data object memory means for storing, in a read only form and absent integrity constraints, a set of view data objects that comprise said base data objects only reformatted into a view corresponding to a need of an application;

means, responsive to receipt of a request to modify data that is stored in said database, for generating a transaction indicative of said receipt of a request to modify data;

means, responsive to said transaction, for identifying a base data object that is the target of said request to modify data;

database server means for performing a data integrity check on said identified base data object using said associated integrity constraints;

database server means for modifying said identified base data object pursuant to said received request.

10. The system for maintaining integrity of data of claim 9 further comprising:

means for identifying all view data objects related to said identified base data object; and means for propagating said modification to said identified base data object to said identified view data objects stored in said view data object memory means, absent performing a data integrity check on said identified view data objects.

* * * * *